United States Patent
Nakamura et al.

(10) Patent No.: US 12,486,347 B2
(45) Date of Patent: Dec. 2, 2025

(54) POLYVINYL ACETAL RESIN

(71) Applicant: SEKISUI CHEMICAL CO., LTD., Osaka (JP)

(72) Inventors: Kazuto Nakamura, Shiga (JP); Yoshito Arai, Osaka (JP); Isao Higuchi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 752 days.

(21) Appl. No.: 17/762,849

(22) PCT Filed: Sep. 25, 2020

(86) PCT No.: PCT/JP2020/036374
§ 371 (c)(1),
(2) Date: Mar. 23, 2022

(87) PCT Pub. No.: WO2021/060499
PCT Pub. Date: Apr. 1, 2021

(65) Prior Publication Data
US 2023/0002286 A1    Jan. 5, 2023

(30) Foreign Application Priority Data

Sep. 27, 2019 (JP) .................................. 2019-177563
Jun. 24, 2020 (JP) .................................. 2020-108927

(51) Int. Cl.
*C08F 216/38* (2006.01)
*C04B 35/468* (2006.01)
(Continued)

(52) U.S. Cl.
CPC ........ *C08F 216/38* (2013.01); *C04B 35/4682* (2013.01); *C04B 35/6342* (2013.01);
(Continued)

(58) Field of Classification Search
CPC .... C04B 35/6342; C08F 16/38; C08F 116/38; C08F 216/38
See application file for complete search history.

(56) References Cited

U.S. PATENT DOCUMENTS 12,043,722 B2 * 7/2024 Kobayashi ............... H01B 1/22
2014/0205805 A1 7/2014 Takihara et al.
(Continued)

FOREIGN PATENT DOCUMENTS

CN 105658595 6/2016
EP 1 369 439 12/2003
(Continued)

OTHER PUBLICATIONS

International Search Report issued Dec. 8, 2020 in corresponding International (PCT) Patent Application No. PCT/JP2020/036374.

*Primary Examiner* — Randy P Gulakowski
*Assistant Examiner* — David L Miller
(74) *Attorney, Agent, or Firm* — Wenderoth, Lind & Ponack, L.L.P.

(57) ABSTRACT

The present invention provides a polyvinyl acetal resin which leaves less fine undissolved matter when dissolved in an organic solvent and thus can improve productivity particularly when used as a binder for a ceramic green sheet, and which can also provide a ceramic green sheet having excellent toughness and enables production of a highly reliable multilayer ceramic capacitor. Provided is a polyvinyl acetal resin having: a wavenumber A ($cm^{-1}$) of a peak within a range of 3,100 to 3,700 $cm^{-1}$ in an IR absorption spectrum measured using an infrared spectrophotometer; and a hydroxy group content (mol %), the wavenumber A of the peak and the hydroxy group content satisfying relations of the following formulas (1) and (2):

[(3,470−A)/Hydroxy group content]≤5.5    (1)

(3,470−A)≤185    (2)

wherein A is a wavenumber which is lower than 3,470 $cm^{-1}$ and at which a transmittance a (%) satisfying [100−(100−X)/2] is exhibited, where X (%) is a minimum transmittance of the peak within the wavenumber range of 3,100 to 3,700 $cm^{-1}$.

8 Claims, 3 Drawing Sheets

(51) Int. Cl.
  *C04B 35/634*   (2006.01)
  *C08F 16/38*    (2006.01)
  *C08F 116/38*   (2006.01)
  *H01G 4/12*     (2006.01)

(52) U.S. Cl.
  CPC ............ *C08F 16/38* (2013.01); *C08F 116/38* (2013.01); *H01G 4/12* (2013.01); *C04B 2235/3236* (2013.01)

(56) References Cited

U.S. PATENT DOCUMENTS

| | | | |
|---|---|---|---|
| 2014/0334071 | A1 | 11/2014 | Endo et al. |
| 2015/0079519 | A1 | 3/2015 | Shibuya |
| 2016/0311199 | A1* | 10/2016 | Iwamoto ............... B32B 27/306 |
| 2017/0037271 | A1 | 2/2017 | Kobayashi et al. |
| 2023/0002286 | A1 | 1/2023 | Nakamura et al. |

FOREIGN PATENT DOCUMENTS

| | | |
|---|---|---|
| EP | 3 109 263 | 12/2016 |
| JP | 58-1766 | 1/1983 |
| JP | 63-22882 | 1/1988 |
| JP | 9-105679 | 4/1997 |
| JP | 2003-155332 | 5/2003 |
| JP | 2005-325342 | 11/2005 |
| JP | 2007-138114 | 6/2007 |
| JP | 2008-133371 | 6/2008 |
| JP | 2010-118470 | 5/2010 |
| JP | 2012-193084 | 10/2012 |
| JP | 2012-216488 | 11/2012 |
| JP | 2013-187022 | 9/2013 |
| JP | 2015-67707 | 4/2015 |
| JP | 2017-63196 | 3/2017 |
| JP | 2017-228780 | 12/2017 |
| JP | 2018-53200 | 4/2018 |
| JP | 2021-57333 | 4/2021 |
| JP | 2021-75728 | 5/2021 |
| TW | 201541469 | 11/2015 |
| WO | 2013/024887 | 2/2013 |
| WO | 2013/153873 | 10/2013 |
| WO | 2015/141623 | 9/2015 |
| WO | 2021/060499 | 4/2021 |

* cited by examiner

Fig. 3

POLYVINYL ACETAL RESIN

TECHNICAL FIELD

The present invention relates to a polyvinyl acetal resin which leaves less fine undissolved matter when dissolved in an organic solvent and thus can improve productivity particularly when used as a binder for a ceramic green sheet, and which can also provide a ceramic green sheet having excellent toughness and enables production of a highly reliable multilayer ceramic capacitor.

BACKGROUND ART

Recent electronic components installed in various electronic devices have become increasingly smaller and multilayered. Multilayer electronic components, such as multilayer circuit boards, multilayer coils, and multilayer ceramic capacitors, have been widely used.

Multilayer ceramic capacitors are typically produced through the following steps.

First, a plasticizer, a dispersant, and the like are added to a solution of a binder resin such as a polyvinyl butyral resin or a poly(meth)acrylate resin in an organic solvent. Ceramic raw material powder is then added and uniformly mixed in a mixer such as a bead mill or a ball mill and deaerated, whereby a ceramic slurry composition having a specific viscosity is obtained. This slurry composition is cast on a surface of a support such as a release-treated polyethylene terephthalate film or a SUS plate using a doctor blade, a reverse roll coater, or the like. The slurry composition is subjected to heating or the like to remove the organic solvent and other volatile components, and then separated from the support to give a ceramic green sheet.

Next, the obtained ceramic green sheet is screen-printed with a conductive paste that is to serve as an internal electrode. Sheets obtained in this manner are stacked such that the ceramic green sheets and the conductive paste layers alternate with each other, and thermally pressure-bonded to produce a laminate. The obtained laminate is subjected to a treatment called debinding, that is, a treatment to remove components such as the binder resin component in the laminate by heat decomposition. The laminate is then fired to produce a ceramic sintered body, and external electrodes are sintered to the end surfaces of the ceramic sintered body. Through these steps, a multilayer ceramic capacitor is obtained.

Polyvinyl acetal resins used for producing ceramic green sheets are typically used as solutions in organic solvents such as methyl ethyl ketone, toluene, alcohol, and mixtures of these. However, conventional polyvinyl acetal resins may leave trace amounts of undissolved matter when dissolved in organic solvents. Such undissolved matter present in solutions used in multilayer ceramic capacitors tends to cause voids in the debinding step and the firing step or lowers the dispersibility of ceramic powder and the like, thus lowering the electrical characteristics of the resulting products.

Thus, using a polyvinyl acetal resin in a ceramic green sheet application requires removal of undissolved matter by a filtration step after mixing the polyvinyl acetal resin with organic/inorganic compounds and the like and dissolving them in an organic solvent.

In response to this, Patent Literature 1 proposes a polyvinyl acetal resin, wherein the rate of decrease in filtration flow rate is lower than 10% when a 5% by weight solution of the polyvinyl acetal resin in a 1:1 solvent mixture of methyl ethyl ketone and/or toluene and ethanol is filtrated using a 5-μm-aperture filter at a filtration temperature of 25° C. and a filtration pressure of 10 mmHg. Patent Literature 1 also teaches that using such a polyvinyl acetal resin can improve productivity because such a resin leaves less undissolved matter when dissolved in an organic solvent and thus can shorten the filtration time.

CITATION LIST

Patent Literature

Patent Literature 1: JP 2005-325342 A

SUMMARY OF INVENTION

Technical Problem

Meanwhile, with the recent increase in functionality and reduction in size of electronic devices, multilayer ceramic capacitors having smaller size and larger capacity have been demanded. To meet such a demand, finer undissolved matter must be sufficiently removed. However, even the polyvinyl acetal resin disclosed in Patent Literature 1 may leave finer undissolved matter that cannot be sufficiently removed, and may require filtration or the like to remove the undissolved matter, lowering productivity.

The present invention aims to provide a polyvinyl acetal resin which leaves less fine undissolved matter when dissolved in an organic solvent and thus can improve productivity particularly when used as a binder for a ceramic green sheet, and which can also provide a ceramic green sheet having excellent toughness and enables production of a highly reliable multilayer ceramic capacitor.

Solution to Problem

The present invention relates to a polyvinyl acetal resin having: a wavenumber A ($cm^{-1}$) of a peak within a range of 3,100 to 3,700 $cm^{-1}$ in an IR absorption spectrum measured using an infrared spectrophotometer; and a hydroxy group content (mol %), the wavenumber A of the peak and the hydroxy group content satisfying relations of the following formulas (1) and (2):

$$[(3{,}470-A)/\text{Hydroxy group content}] \leq 5.5 \qquad (1)$$

$$(3{,}470-A) \leq 185 \qquad (2)$$

wherein A is a wavenumber which is lower than 3,470 $cm^{-1}$ and at which a transmittance a (%) satisfying [100−(100−X)/2] is exhibited, where X (%) is a minimum transmittance of the peak within the wavenumber range of 3,100 to 3,700 $cm^{-1}$. The present invention is described in detail below.

The present inventors made intensive studies to find out the following: a polyvinyl acetal resin in which a wavenumber A of a peak, at which the transmittance satisfies a predetermined relation with the minimum transmittance, and the hydroxy group content satisfy a specific relation leaves less undissolved matter when dissolved in an organic solvent, and can improve productivity particularly when used as a binder for a ceramic green sheet. The inventors also found out that using such a polyvinyl acetal resin as a binder resin for a ceramic green sheet enables production of ceramic green sheets capable of providing highly reliable multilayer ceramic capacitors that are less susceptible to sheet defects. The inventors thus completed the present invention.

Figure 1:
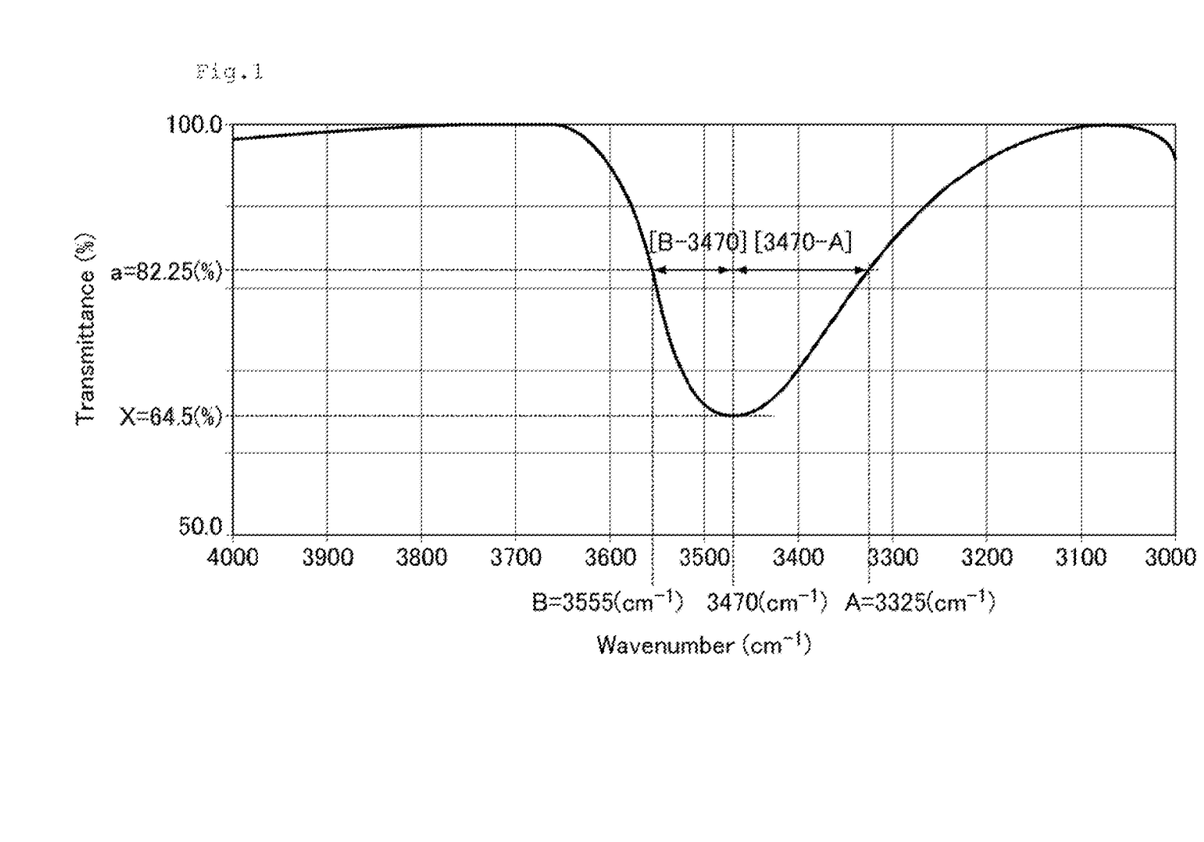
FIG. 1 is an exemplary IR absorption spectrum of the polyvinyl acetal resin of the present invention obtained by IR absorption spectrometry.

FIG. 1 shows an exemplary IR absorption spectrum of the polyvinyl acetal resin of the present invention measured at 20° C. using an infrared spectrophotometer. FIG. 1 shows the transmittance on the vertical axis and the wavenumber on the horizontal axis.

In the IR absorption spectrum shown in FIG. 1, the minimum transmittance X is 64.5%. The transmittance a satisfying [100−(100−X)/2] is 82.25%. The wavenumber A of the peak which is lower than 3,470 cm$^{-1}$ and at which the transmittance a is exhibited is 3,325 cm$^{-1}$. The wavenumber B of the peak which is higher than 3,470 cm$^{-1}$ and at which the transmittance a is exhibited is 3,555 cm$^{-1}$.

In the above case, (3,470−A) is 145 (cm$^{-1}$). For example, when the hydroxy group content is 30 mol %, [(3,470−A)/ Hydroxy group content] is 4.83 (cm$^{-1}$/mol %). (B−3,470) is 85 (cm$^{-1}$), and (3,470−A)/(B−3,470) is 1.70.

Figure 2:
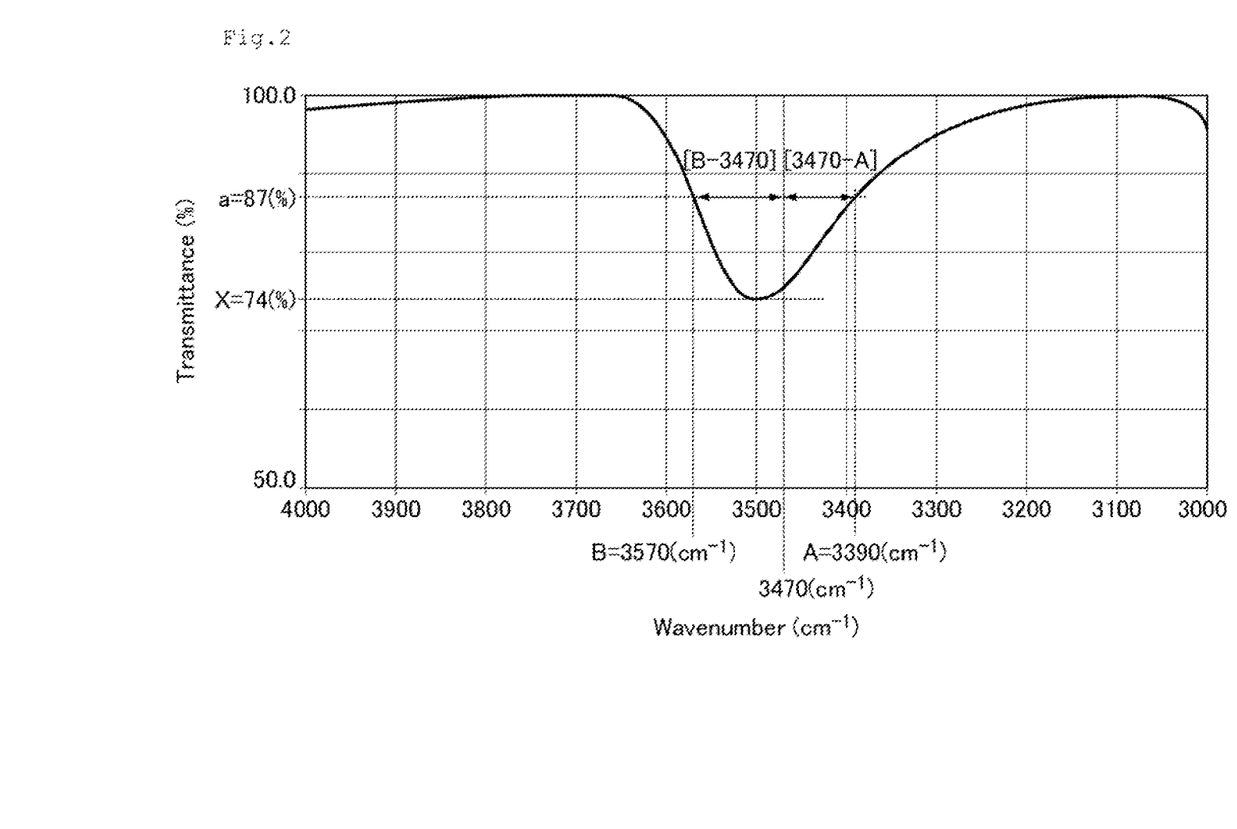
FIG. 2 is an exemplary IR absorption spectrum of the polyvinyl acetal resin of the present invention obtained by IR absorption spectrometry.

FIG. 2 shows another exemplary embodiment of an IR absorption spectrum of the polyvinyl acetal resin according to the present invention measured at 20° C. using an infrared spectrophotometer.

In the IR absorption spectrum shown in FIG. 2, the minimum transmittance X is 74%. The transmittance a satisfying [100−(100−X)/2] is 87%. The wavenumber A of the peak which is lower than 3,470 cm and at which the transmittance a is exhibited is 3,390 cm$^{-1}$. The wavenumber B of the peak which is higher than 3,470 cm$^{-1}$ and at which the transmittance a is exhibited is 3,570 cm$^{-1}$.

In the above case, (3,470−A) is 80 (cm$^{-1}$). For example, when the hydroxy group content is 22 mol %, [(3,470−A)/ Hydroxy group content] is 3.64 (cm$^{-1}$/mol %). (B−3,470) is 100 (cm$^{-1}$), and (3,470−A)/(B−3,470) is 0.80.

The IR absorption spectrum can be measured using, for example, a Fourier transform infrared spectrophotometer (e.g., "FT-720" produced by HORIBA, "FT/IR-4000" produced by JASCO Corporation) at 20° C. by the transmission method.

In the analysis of the polyvinyl acetal resin using an infrared spectrophotometer, a spectrum appears near 2,980 cm$^{-1}$, which is derived from the stretching vibrations of the C—H bond of the polyvinyl acetal resin. The peak analysis first involves adjusting the thickness of the measurement sample such that the peak derived from the stretching vibrations of the C—H bond, with a baseline connecting 2,500 cm$^{-1}$ and 3,050 cm$^{-1}$, has a minimum transmittance of 20 to 25%, and then performing measurement. In the measurement results, a baseline is drawn for the peak appearing within the wavenumber range of 3,100 to 3,700 cm$^{-1}$, and correction is performed to adjust the transmittance at both ends of the peak to 100%. The corrected data is then analyzed.

In the polyvinyl acetal resin of the present invention, the wavenumber A (cm$^{-1}$) of the peak within wavenumber range of 3,100 to 3,700 cm and the hydroxy group content (mol %) satisfy the relation of the following formula (1).

$$[(3{,}470-A)/\text{Hydroxy group content}] \le 5.5 \quad (1)$$

Satisfying the relation makes it possible to reduce fine undissolved matter.

The upper limit of the [(3,470−A)/Hydroxy group content] is preferably 5.2 cm$^{-1}$/mol %. The lower limit thereof is not limited, and is preferably 2.5 cm$^{-1}$/mol %.

In the polyvinyl acetal resin of the present invention, the wavenumber A (cm$^{-1}$) of the peak within the wavenumber range of 3,100 to 3,700 cm$^{-1}$ satisfies the relation of the following formula (2).

$$(3{,}470-A) \le 185 \quad (2)$$

A greater difference between the wavenumber 3,470 cm$^{-1}$ and the wavenumber A (cm$^{-1}$) of the peak (3,470−A) suggests that a larger number of associated OH groups exist. A portion with many associated OH groups has high polarity, and thus is less soluble in an organic solvent.

The upper limit of the (3,470−A) is preferably 175 cm$^{-1}$, more preferably 170 cm$^{-1}$. The lower limit thereof is preferably 60 cm$^{-1}$, more preferably 65 cm$^{-1}$.

The lower limit of the difference is not limited, and is preferably as small as possible.

The minimum transmittance X (%) is derived from the hydroxy group content of the polyvinyl acetal resin. The hydroxy group content is preferably 18 to 40 mol % for the reason described later. The lower limit of the minimum transmittance X is thus preferably 53%, more preferably 58% and the upper limit thereof is preferably 85%, more preferably 83%.

A smaller wavenumber B (cm$^{-1}$) of the peak suggests that a larger number of associated OH groups exist. A portion with many associated OH groups has high polarity, and thus is less soluble in an organic solvent. The lower limit of the wavenumber B (cm$^{-1}$) of the peak is thus preferably 3,520 cm$^{-1}$ more preferably 3,540 cm$^{-1}$.

The upper limit thereof is preferably 3,620 cm$^{-1}$, more preferably 3,600 cm$^{-1}$.

The wavenumber A (cm$^{-1}$) of the peak and the wavenumber B (cm$^{-1}$) of the peak preferably satisfy a relation of the following formula (3) so that the number of associated OH groups is not too large.

$$(3{,}470-A)/(B-3{,}470) \le 3.0 \quad (3)$$

B is a wavenumber which is higher than 3,470 cm$^{-1}$ and at which the transmittance a (%) satisfying (100−(100−X)/2) is exhibited, where X (%) is the minimum transmittance of the peak within the wavenumber range of 3,100 to 3,700 cm$^{-1}$.

The upper limit of the (3,470−A)/(8−3,470) is preferably 2.0, more preferably 1.8. The lower limit thereof is preferably 0.0, more preferably 0.5.

The wavenumber A of the peak preferably satisfies a relation of the following formula (4).

$$(3{,}470-A)/\text{Acetal group content} \le 3.0 \quad (4)$$

When the relation is satisfied, the polyvinyl acetal resin leaves even less undissolved matter when dissolved in an organic solvent.

The upper limit of the (3,470−A)/Acetal group content is more preferably 2.7, still more preferably 2.5.

The wavenumber B of the peak preferably satisfies a relation of the following formula (5).

$$(B-3{,}470)/\text{Hydroxy group content} \ge 2.3 \quad (5)$$

When the relation is satisfied, sheets defects can be reduced, so that a more reliable multilayer ceramic capacitor can be produced.

The lower limit of the (B−3,470)/Hydroxy group content is more preferably 2.5, still more preferably 2.75.

The wavenumber B of the peak preferably satisfies a relation of the following formula (6).

$$(B-3{,}470)/\text{Acetal group content} \ge 1.2 \quad (6)$$

When the relation is satisfied, the resulting ceramic green sheet can have excellent surface smoothness and prevent laminate defects.

The lower limit of the (B−3,470)/Acetal group content is more preferably 1.4, still more preferably 1.5.

In the polyvinyl acetal resin of the present invention, a wavenumber C of the peak at which the minimum transmittance X (%) is exhibited, the wavenumber A of the peak, and the wavenumber B of the peak preferably satisfy a relation of the following formula (7) so that the number of associated OH groups is not too large.

$$(C-A)/(B-C) \leq 2.1 \qquad (7)$$

The upper limit of the (C–A)/(B–C) is more preferably 2.0, still more preferably 1.9.

The wavenumber A of the peak and the wavenumber C of the peak preferably satisfy a relation of the following formula (8).

$$(C-A)/\text{Acetal group content} \leq 3.0 \qquad (8)$$

When the relation is satisfied, the resulting polyvinyl acetal resin can have high modulus of elasticity and excellent mechanical strength.

The upper limit of the (C–A)/Acetal group content is more preferably 2.8, still more preferably 2.5.

The wavenumber A of the peak and the wavenumber B of the peak can be adjusted by, for example, appropriately setting the crystallinity and the degree of saponification of a raw material polyvinyl alcohol resin, acetalization reaction conditions such as reaction time and reaction temperature, and the acetal group content and the hydroxy group content of the polyvinyl acetal resin.

In the polyvinyl acetal resin of the present invention, preferably, a solution of the polyvinyl acetal resin at a concentration of 0.2% by weight in a 1:1 weight ratio mixture solution of ethanol and toluene has a percentage of particles having a diameter of 0.5 to 1.0 μm of $4.42 \times 10^{-8}$% by volume or lower relative to 100% by volume of the resin solution when a particle size distribution of the resin solution is determined using a particle counter. The number of particles having a diameter of 0.5 to 1.0 μm is measured using a particle counter. The volume of the particles having a diameter of 0.5 to 1.0 μm is calculated assuming that they are true spheres having a diameter of 0.75 μm. Based on the number of particles and the volume, the percentage (% by volume) of particles having a diameter of 0.5 to 1.0 μm is calculated.

When the percentage is $4.42 \times 10^{-8}$% by volume or lower, the filtration time can be shortened. In addition, a more uniform slurry can be obtained and a more smooth green sheet can be produced. Such a green sheet is less susceptible to sheet defects such as cracks or pinholes, thus reducing the occurrence of breakdown. In other words, advantageously, a more reliable multilayer ceramic capacitor can be obtained.

The percentage is more preferably $3.31 \times 10^{-8}$% by volume or lower. The lower limit is preferably as low as possible. The lower limit is preferably 0% by volume.

The particle counter may be "KS-42C" produced by Rion Co., Ltd., for example.

The percentage by volume of particles having a diameter of 0.5 to 1.0 μm can be adjusted by, for example, appropriately setting the crystallinity and the degree of saponification of a raw material polyvinyl alcohol resin, acetalization reaction conditions, and the acetal group content and the hydroxy group content of the polyvinyl acetal resin.

From the standpoint of maintaining mechanical strength when producing a thin film ceramic green sheet, the lower limit of the average degree of polymerization of the polyvinyl acetal resin of the present invention is preferably 300, more preferably 600. From the standpoint of the solubility in an organic solvent and melt viscosity, the upper limit thereof is preferably 8,000, more preferably 7,000.

The average degree of polymerization can be measured in conformity with JIS K 6726.

The polyvinyl acetal resin of the present invention preferably contains an acetal group-containing constitutional unit represented by the following formula (9), a hydroxy group-containing constitutional unit represented by the following formula (10), and an acetyl group-containing constitutional unit represented by the following formula (11).

[Chem. 1]

In the formula (9), $R^1$ represents a hydrogen atom or a C1-C20 alkyl group.

When $R^1$ in the formula (9) is a C1-C20 alkyl group, examples of the alkyl group include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

In the polyvinyl acetal resin of the present invention, the lower limit of the amount of the acetal group-containing constitutional unit represented by the formula (9) (hereinafter also referred to as an "acetal group content") is preferably 45 mol % and the upper limit thereof is preferably 80 mol %.

The polyvinyl acetal resin having an acetal group content of 45 mol % or more can have improved solubility in an organic solvent. The polyvinyl acetal resin having an acetal group content of 80 mol % or less can have excellent toughness.

The lower limit of the acetal group content is more preferably 47 mol %, still more preferably 49 mol %, and the upper limit thereof is more preferably 78 mol %, still more preferably 76 mol %.

The acetal group content can be measured by NMR, for example.

Since an acetal group in a polyvinyl acetal resin is obtained by acetalizing two hydroxy groups in polyvinyl alcohol, the acetal group content is calculated by counting acetalized two hydroxy groups.

In the polyvinyl acetal resin of the present invention, the lower limit of the amount of the hydroxy group-containing constitutional unit represented by the formula (10) (hereinafter also referred to as a "hydroxy group content") is preferably 18 mol % and the upper limit thereof is preferably 40 mol %.

The polyvinyl acetal resin having a hydroxy group content of 18 mol % or more can have excellent toughness. The polyvinyl acetal resin having a hydroxy group content of 40 mol % or less can have sufficiently improved solubility in an organic solvent.

The lower limit of the hydroxy group content is more preferably 20 mol %, still more preferably 22 mol %, and the upper limit thereof is more preferably 39 mol %, still more preferably 38 mol %.

The hydroxy group content can be measured by NMR, for example.

In the polyvinyl acetal resin of the present invention, the lower limit of the amount of the acetyl group-containing constitutional unit represented by the formula (11) (hereinafter also referred to as an "acetyl group content") is preferably 0.5 mol % and the upper limit thereof is preferably 20 mol %.

The polyvinyl acetal resin having an acetyl group content of 0.5 mol % or more can reduce a viscosity increase in a composition for a ceramic green sheet caused by intramolecular or intermolecular hydrogen bonding between hydroxy groups in the polyvinyl acetal resin. The polyvinyl acetal resin having an acetyl group content of 20 mol % or less does not have too high flexibility and can have improved handleability.

The lower limit of the acetyl group content is more preferably 0.6 mol %, still more preferably 1.0 mol %, and the upper limit thereof is more preferably 16 mol %.

The acetyl group content can be measured by NMR, for example.

The lower limit of the weight average molecular weight (Mw) of the polyvinyl acetal resin of the present invention is preferably 40,000, more preferably 70,000 and the upper limit thereof is preferably 1,400,000, more preferably 1,200,000.

The lower limit of the number average molecular weight (Mn) of the polyvinyl acetal resin of the present invention is preferably 15,000, more preferably 40,000 and the upper limit thereof is preferably 500,000, more preferably 400,000.

In the polyvinyl acetal resin of the present invention, the lower limit of the ratio (Mw/Mn) of the weight average molecular weight (Mw) to the number average molecular weight (Mn) is preferably 2.0, more preferably 2.2 and the upper limit thereof is preferably 4.0, more preferably 3.7.

The Mw and Mn can be measured by, for example, gel permeation chromatography (GPC) using appropriate standards (e.g., polystyrene standards). Examples of the column used in measuring the Mw and Mn include TSKgel Super/MN-H.

The polyvinyl acetal resin of the present invention can be typically produced by acetalizing a polyvinyl alcohol resin.

The polyvinyl alcohol resin may be, for example, a conventionally known polyvinyl alcohol resin such as a resin produced by saponifying a polyvinyl acetate resin with an alkali, an acid, aqueous ammonia, or the like.

The polyvinyl alcohol resin may be completely saponified, but is not necessarily completely saponified and may be a partially saponified polyvinyl alcohol resin as long as the polyvinyl alcohol resin has at least one unit having a hydroxyl group diad for a meso or a racemo position in at least one position of the main chain. Examples of other polyvinyl alcohol resins that can be used include copolymers of vinyl alcohol and a monomer copolymerizable with vinyl alcohol, such as ethylene-vinyl alcohol copolymer resins and partially saponified ethylene-vinyl alcohol copolymer resins.

Examples of the polyvinyl acetate resin include ethylene-vinyl acetate copolymers.

The polyvinyl alcohol resin preferably has a crystallinity of 37% or lower, more preferably 36% or lower, still more preferably 334 or lower.

Use of the polyvinyl alcohol resin allows the number of particles of undissolved matter to be in a predetermined range as measured by the above method.

The lower limit of the crystallinity of the polyvinyl alcohol resin is not limited. The lower limit is preferably as small as possible, and may be 0% or higher or 3% or higher.

The crystallinity can be measured by differential scanning calorimetry (DSC), as descried later in Examples.

The polyvinyl alcohol resin preferably has a degree of saponification of 70 mol % or higher and 99.4 mol % or lower, more preferably 78 mol % or higher and 98 mol % or lower.

Use of the polyvinyl alcohol resin allows the number of particles of undissolved matter to be in a predetermined range as measured by the above method.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, amide solvents, and amine solvents.

Examples of the alcoholic organic solvents include methanol, ethanol, n-propanol, isopropanol, n-butanol, and tert-butanol.

Examples of the aromatic organic solvents include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of the ability to dissolve resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluenesulfonic acid. These acid catalysts may be used alone, or two or more types of compounds may be used in combination. Preferred among these are hydrochloric acid, nitric acid, and sulfuric acid, and particularly preferred is hydrochloric acid.

In the method for producing the polyvinyl acetal resin of the present invention, the polyvinyl alcohol resin is preferably stirred for two hours or longer at 90° C. or higher before starting acetalization.

Stirring for two hours or longer allows the polyvinyl alcohol resin to be sufficiently dissolved, thus sufficiently increasing the degree of acetalization and reducing undissolved matter.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization reaction is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include benzaldehyde, cinnamaldehyde, 2-methylbenzaldehyde, 3 methylbenzaldehyde, 4-methylbenzaldehyde, p-hydroxybenzaldehyde, m-hydroxybenzaldehyde, phenylacetaldehyde, and β-phenylpropionaldehyde.

These aldehydes may be used alone, or two or more types thereof may be used in combination. Preferred among these aldehydes are formaldehyde, acetaldehyde, butyraldehyde, 2-ethylhexylaldehyde, and n-nonylaldehyde because they are excellent in acetalization reactivity and can give the resin to be prepared a sufficient internal plasticization effect to impart favorable flexibility. More preferred are formaldehyde, acetaldehyde, and butyraldehyde because they can provide an adhesive composition particularly excellent in impact resistance and adhesiveness to metal.

The amount of the aldehyde can be appropriately determined in accordance with the acetal group content of the aimed polyvinyl acetal resin. In particular, the amount is preferably 50 mol % or more and 95 mol % or less, more preferably 55 mol % or more and 90 mol % or less relative to 100 mol % of the polyvinyl alcohol because the acetalization reaction can be carried out efficiently and unreacted aldehyde is easily removable.

The holding time after reaction is preferably 1.5 hours or longer, more preferably 2 hours or longer, depending on other conditions. Such holding time allows acetalization reaction to sufficiently progress.

The holding temperature after reaction is preferably 15° C. or higher, more preferably 20° C. or higher. Such holding temperature allows acetalization reaction to sufficiently progress.

A composition for a ceramic green sheet can be produced by mixing the polyvinyl acetal resin of the present invention and an organic solvent.

The organic solvent is not limited, and may be any organic solvent that can dissolve the polyvinyl acetal resin. Examples of the organic solvent include ketones such as acetone, methyl ethyl ketone, dipropyl ketone, and diisobutyl ketone. Examples also include alcohols such as methanol, ethanol, isopropanol, and butanol, and aromatic hydrocarbons such as toluene and xylene. Examples also include esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate. Examples also include methyl cellosolve, ethyl cellosolve, butyl cellosolve, terpineol, dihydroterpineol, butyl cellosolve acetate, butyl carbitol acetate, terpineol acetate, and dihydroterpineol acetate. From the standpoint of application properties and drying properties, particularly preferred are alcohols, ketones, aromatic hydrocarbons, and solvent mixtures of these. More preferred among these are solvent mixtures of ethanol and toluene and solvent mixtures of methyl ethyl ketone and toluene.

The amount of the organic solvent in the slurry composition for a ceramic green sheet is set according to factors such as the type of the polyvinyl acetal resin used, and thus is not limited. The organic solvent in too small an amount is less likely to provide solubility required for kneading. The organic content in too large an amount may excessively lower the viscosity of the slurry composition for a ceramic green sheet and deteriorate handleability in producing a ceramic green sheet. The organic solvent content is thus preferably 20% by weight or more, 80% by weight or less.

The composition for a ceramic green sheet may contain a plasticizer. Adding a plasticizer can significantly improve the mechanical strength and flexibility of the resulting ceramic green sheet.

Examples of the plasticizer include: phthalate diesters such as dioctyl phthalate (OOP) and dibutyl phthalate (DBP); adipate diesters such as dioctyl adipate; and alkylene glycol diesters such as triethylene glycol-di-2-ethylhexanoate, tetraethylene glycol-di-2-ethylhexanoate, triethylene glycol-di-2-ethylbutyrate, tetraethylene glycol-di-2-ethylbutyrate, tetraethylene glycol-di-heptanoate, and triethylene glycol-di-heptanoate.

In the composition for a ceramic green sheet, the lower limit of the amount of the plasticizer relative to 100 parts by weight of the polyvinyl acetal resin is preferably 7 parts by weight, more preferably 8.5 parts by weight, and the upper limit thereof is preferably 18 parts by weight, more preferably 13.5 parts by weight.

The composition for a ceramic green sheet may contain a different resin such as a polyvinyl acetal resin other than the polyvinyl acetal resin of the present invention, an acrylic resin, or ethylcellulose, as long as the effects of the present invention are not impaired. In such a case, the amount of the above polyvinyl acetal resin of the present invention relative to the entire binder resin is preferably 504 by weight or more.

To the composition for a ceramic green sheet may be added ceramic powder, a dispersant, an antioxidant, an ultraviolet absorber, a surfactant, a filler, and/or the like, as needed. In some cases, a small amount of a different resin such as an acrylic resin or a urethane resin may be added.

Examples of the ceramic powder include powders of an oxide or non-oxide of a metal or non-metal used in ceramic production. These powders each may be a powder of one compound having a single composition or a mixture of compounds each having a single composition. For the constituent elements of the oxide or non-oxide of a metal, both the cation and anion may be composed of a single element or multiple elements. The oxide or non-oxide may further contain an additive to improve the characteristics of the oxide or non-oxide. Specific examples thereof include oxides, carbides, nitrides, borides, and sulfides of Li, K, Mg, B, Al, Si, Cu, Ca, Sr, Ba, Zn, Cd, Ga, In, Y, lanthanoid, actinoid, Ti, Zr, Hf, Bi, V, Nb, Ta, N, Mn, Fe, Co, and Ni.

Specific examples of a powder of an oxide containing multiple metal elements, which is typically called a multiple oxide, can be classified as follows by their crystalline structure. Examples of those having a perovskite-type structure include $NaNbO_3$, $SrZrO_3$, $PbZrO_3$, $SrTiO_3$, $BaZrO_3$, $PbTiO_3$, and $BaTiO_3$. Examples of those having a spinel-type structure include $MgAl_2O_4$, $ZnAl_2O_4$, $CoAl_2O_4$, $NiAl_2O_4$, and $MgFe_2O_4$. Examples of those having an ilmenite-type structure include $MgTiO_3$, $MnTiO_3$, and $FeTiO_3$. Examples of those having a garnet-type structure include $GdGa_5O_{12}$ and $Y_6Fe_5O_{12}$. In particular, the modified polyvinyl acetal resin of the present application exhibits high characteristics for a ceramic green sheet containing $BaTiO_3$ powder.

The ceramic powder may have any average particle size. For example, for production of a thin ceramic green sheet. (thickness of 5 μm or less), the average particle size is preferably 0.5 μm or less.

The method for producing the composition for a ceramic green sheet is not limited. For example, the composition may be produced by a method including mixing the polyvinyl acetal resin of the present invention, the organic solvent, and optional various additives in any of various mixers such as a ball mill, a blender mill, or a triple roll mill.

A resin sheet can be obtained by applying the composition for a ceramic green sheet and then heating and drying the composition.

The method for applying the composition for a ceramic green sheet is not limited. Examples thereof include a roll coater, a die coater, and a curtain coater. For other specific methods, conventionally known methods may be used.

A resin sheet containing ceramic powder can be used as a ceramic green sheet.

The ceramic green sheet may be used to produce a ceramic electronic component. For example, a ceramic electronic component may be produced by performing the steps of: applying a paste for an electrode layer to a surface of the ceramic green sheet; stacking and thermally pressure-bonding ceramic green sheets each provided with an electrode layer; and debinding and firing the obtained laminate.

The ceramic electronic component is not limited. Examples thereof include multilayer ceramic capacitors, multilayer ceramic inductors, capacitors, piezoelectric actuators, multilayer varistors, multilayer thermistors, EMI filters, aluminum nitride multilayer boards, and alumina multilayer boards. Such a multilayer ceramic capacitor is also encompassed by the present invention.

In the method for producing the ceramic electronic component, the step of applying a paste for an electrode layer to a surface of the ceramic green sheet is performed.

The paste for an electrode layer may be produced by, for example, dissolving a resin such as a polyvinyl acetal resin, ethyl cellulose, or an acrylic resin as a binder resin in an organic solvent and dispersing conductive powder or the like in the solution. These resins may be used alone or in combination of two or more thereof. A paste fox an electrode layer containing a polyvinyl acetal resin is preferred because such a paste has excellent adhesion to ceramic green sheets in the thermally pressure-bonding step.

In the method for producing the ceramic electronic component, after the above ceramic green sheet provided with an electrode layer is produced, at least one ceramic green sheet provided with an electrode layer is further produced in the same manner, and the ceramic green sheets are stacked and thermally pressure-bonded. The resulting laminate is debinded and fired, whereby a multilayer ceramic electronic component without problems such as sheet attack or cracks can be obtained.

The thermal pressure bonding step and the laminate debinding and firing step are not limited, and can be performed by conventionally known methods.

Advantageous Effects of Invention

The present invention can provide a polyvinyl acetal resin which leaves less fine undissolved matter when dissolved in an organic solvent and thus can improve productivity particularly when used as a binder for a ceramic green sheet, and which can also provide a ceramic green sheet having excellent toughness and enables production of a highly reliable multilayer ceramic capacitor.

DESCRIPTION OF EMBODIMENTS

The present invention is more specifically described in the following with reference to, but not limited to, examples.

Example 1

Pure water (3,000 g) was added co 300 g of a polyvinyl alcohol resin (average degree of polymerization 1,700, degree of saponification 98 mol %, crystallinity 35%). They were stirred at 90° C. for two hours for dissolution. This solution was cooled to 40° C. To the solution were added 200 g of hydrochloric acid having a concentration of 35% by weight and 160 g of n-butyraldehyde, whereby acetalization reaction was performed and a reaction product was precipitated. The amount of n-butyraldehyde added was 68 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

The crystallinity of the polyvinyl alcohol resin was measured by the following method.

Specifically, the polyvinyl alcohol resin was subjected to differential scanning calorimetry using a thermal analyzer (produced by Hitachi High-Tech Science Corporation, DSC6200R) under the following conditions. The heat of fusion in the second heating was measured to measure the crystallinity.

<Measurement Conditions>

0° C. (holding for five minutes)→(first heating at heating rate of 10° C./min)→270° C.→(cooling at cooling rate of 10° C./min)→0° C. (holding for five minutes)→(second heating at heating rate of 10° C./min)→270° C.

Figure 3:
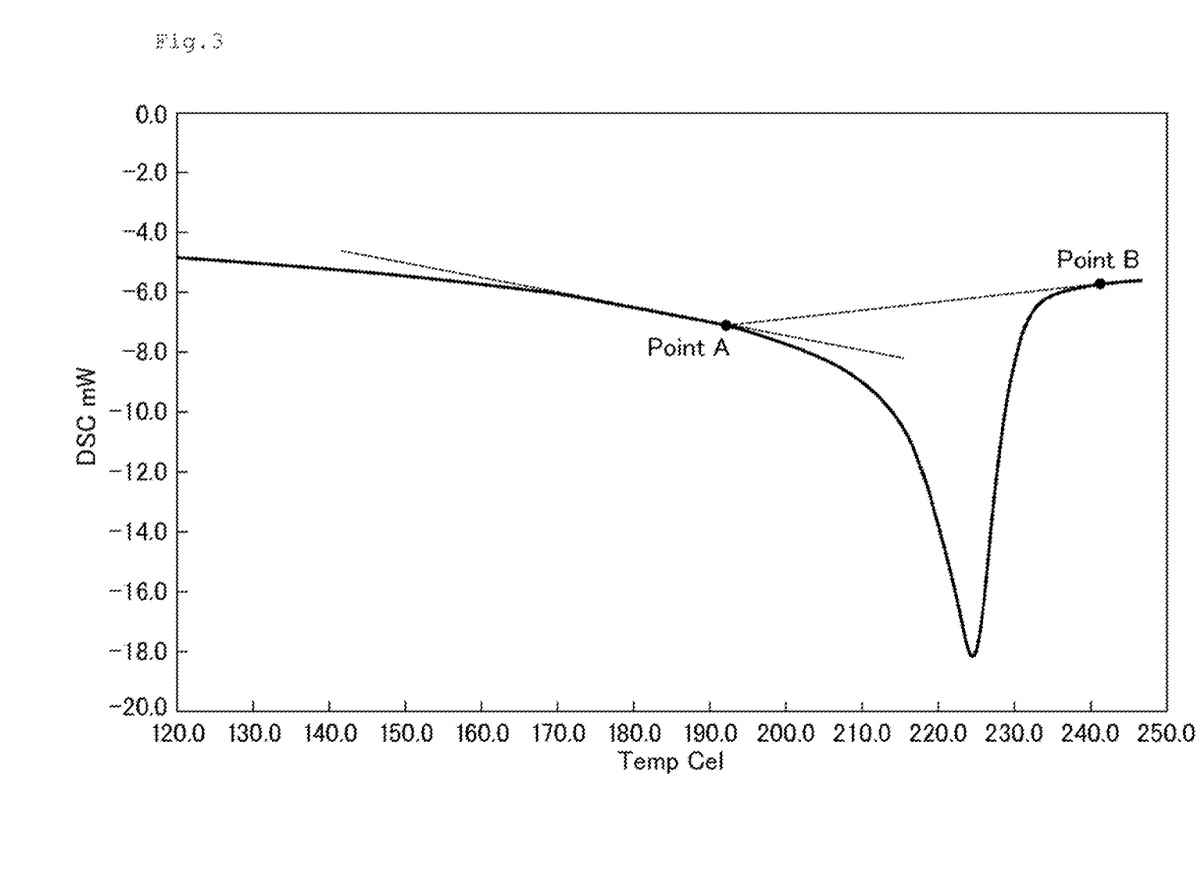
FIG. 3 is a schematic view of a DSC curve.

The heat of fusion was calculated from the area of a peak appearing between 100° C. and 270° C. in the second heating. The area of the peak was, as shown in FIG. 3, determined as the area of the region surrounded by the straight line connecting the points A and B and the DSC curve. The point A was the point at which a straight line drawn along the linear approximation portion of the DSC curve from 170° C. toward the higher temperature side leaves the DSC curve. The point B was the point on the DSC curve that shows the end-of-melt temperature. The crystallinity was calculated assuming that the heat of fusion of a polyvinyl alcohol resin having a crystallinity of 100% was 156 J/g.

Example 2

Pure water (3,100 g) was added to 300 g of a polyvinyl alcohol resin (average degree of polymerization 1,900, degree of saponification 84 mol %, crystallinity 12%). They were stirred at 90° C. for about two hours for dissolution. This solution was cooled to 40° C. To the solution were added 200 g of hydrochloric acid having a concentration of 35% by weight and 130 g of n-butyraldehyde, whereby acetalization reaction was performed and a reaction product was precipitated. The amount of n-butyraldehyde added was 61 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 3

Pure water (3,100 g) was added to 300 g of a polyvinyl alcohol resin (average degree of polymerization 3,000, degree of saponification 98.2 mol %, crystallinity 26%). They were stirred at 90° C. for about two hours for dissolution. This solution was cooled to 40° C. To the solution were added 200 g of hydrochloric acid having a concentration of 354 by weight and 170 g of n-butyraldehyde, whereby acetalization reaction was performed and a reaction product was precipitated. The amount of n-butyraldehyde added was 73 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 4

Pure water (3,100 g) was added to 300 g of a polyvinyl alcohol resin (average degree of polymerization 800, degree of saponification 98.4 mol %, crystallinity 29%). They were stirred at 90° C. for about two hours for dissolution. This solution was cooled to 40° C. To the solution were added 200 g of hydrochloric acid having a concentration of 35% by weight and 150 g of n-butyraldehyde, whereby acetalization reaction was performed and a reaction product was precipitated. The amount of n-butyraldehyde added was 64 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 5

Pure water (3,100 g) was added to 300 g of a polyvinyl alcohol resin (average degree of polymerization 1,700, degree of saponification 99.2 mole, crystallinity 37%). They were stirred at 90° C. for about two hours for dissolution. This solution was cooled to 40° C. To the solution were added 200 g of hydrochloric acid having a concentration of 35% by weight and 160 g of n-butyraldehyde, whereby acetalization reaction was performed and a reaction product was precipitated. The amount of n-butyraldehyde added was 68 mold relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 6

Pure water (3,100 g) was added to 300 g of a polyvinyl alcohol resin (average degree of polymerization 1,700, degree of saponification 99.1 mol %, crystallinity 37%). They were stirred at 90° C. for about two hours for dissolution. This solution was cooled to 40° C. To the solution were added 200 g of hydrochloric acid having a concentration of 35% by weight and 160 g of n-butyraldehyde, whereby acetalization reaction was performed and a reaction product was precipitated. The amount of n-butyraldehyde added was 68 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 7

Pure water (3,100 g) was added to 300 g of a polyvinyl alcohol resin (average degree of polymerization 1,700, degree of saponification 98.3 mol %, crystallinity 33%). They were stirred at 90° C. for about two hours for dissolution. This solution was cooled to 40° C. To the solution were added 200 g of hydrochloric acid having a concentration of 35% by weight and 155 g of n-butyraldehyde, whereby acetalization reaction was performed and a reaction product was precipitated. The amount of n-butyraldehyde added was 66 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 8

Pure water (3,100 g) was added to 300 g of a polyvinyl alcohol resin (average degree of polymerization 1,900, degree of saponification 89 mol %, crystallinity 13%). They were stirred at 90° C. for about two hours for dissolution. This solution was cooled to 40° C. To the solution were added 200 g of hydrochloric acid having a concentration of 35% by weight and 145 g of n-butyraldehyde, whereby acetalization reaction was performed and a reaction product was precipitated. The amount of n-butyraldehyde added was 67 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Example 9

Pure water (3,100 g) was added to 300 g of a polyvinyl alcohol resin (average degree of polymerization 3,000, degree of saponification 88 mol %, crystallinity 13%). They were stirred at 90° C. for about two hours for dissolution. To the solution were added 200 g of hydrochloric acid having a concentration of 35% by weight and 165 g of n-butyraldehyde, whereby acetalization reaction was performed and a reaction product was precipitated. The amount of n-butyraldehyde added was 76 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 1

Pure water (3,000 g) was added to 300 g of a polyvinyl alcohol resin (average degree of polymerization 1,700, degree of saponification 99.5 mol %, crystallinity 40%). They were stirred at 90° C. for about two hours for dissolution. This solution was cooled to 40° C. To the solution were added 200 g of hydrochloric acid having a concentration of 35% by weight and 160 g of n-butyraldehyde, whereby acetalization reaction was performed and a reaction product was precipitated. The amount of n-butyraldehyde added was 68 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 2

Pure water (3,100 g) was added to 300 g of a polyvinyl alcohol resin (average degree of polymerization 1,900, degree of saponification 80 mol %, crystallinity 13%). They were stirred at 90° C. for about two hours for dissolution. This solution was cooled to 40° C. To the solution were added 200 g of hydrochloric acid having a concentration of 35% by weight and 100 g of n-butyraldehyde, whereby acetalization reaction was performed and a reaction product was precipitated. The amount of n-butyraldehyde added was 50 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 3

Pure water (3,100 g) was added to 150 g of a polyvinyl alcohol resin (average degree of polymerization 8,100, degree of saponification 98 mol %, crystallinity 36%). They were stirred at 90° C. for about two hours for dissolution. This solution was cooled to 40° C. To the solution were added 200 g of hydrochloric acid having a concentration of 354 by weight and 80 g of n-butyraldehyde, whereby acetalization reaction was performed and a reaction product was precipitated. The amount of n-butyraldehyde added was 66 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 4

Pure water (3,100 g) was added to 300 g of a polyvinyl alcohol resin (average degree of polymerization 800, degree of saponification 99.5 mol %, crystallinity 38%). They were stirred at 90° C. for about two hours for dissolution. This solution was cooled to 40° C. To the solution were added 200 q of hydrochloric acid having a concentration of 35% by weight and 135 g of n-butyraldehyde, whereby acetalization reaction was performed and a reaction product was precipitated. The amount of n-butyraldehyde added was 56 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 5

Pure water (3,100 g) was added to 300 g of a polyvinyl alcohol resin (average degree of polymerization 1,700, degree of saponification 99.1 mol %, crystallinity 39%). They were stirred at 90° C. for about two hours for dissolution. This solution was cooled to 40° C. To the solution were added 200 g of hydrochloric acid having a concentration of 35% by weight and 160 g of n-butyraldehyde, whereby acetalization reaction was performed and a reaction product was precipitated. The amount of n-butyraldehyde added was 68 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 6

Pure water (3,100 g) was added to 300 g of a polyvinyl alcohol resin (average degree of polymerization 250, degree of saponification 98.5 mol %, crystallinity 28%). They were stirred at 90° C. for about two hours for dissolution. This solution was cooled to 40° C. To the solution were added 200 g of hydrochloric acid having a concentration of 351 by weight and 150 g of n-butyraldehyde, whereby acetalization reaction was performed and a reaction product was precipitated. The amount of n-butyraldehyde added was 64 mol % relative to 100 mol % of the polyvinyl alcohol resin. The mixture was then held at 40° C. for three hours to complete the reaction. Neutralization, washing with water, and drying were performed by conventional methods, whereby white powder of a polyvinyl acetal resin was obtained.

Comparative Example 7

Pure water (3,100 g) was added co 300 g of a polyvinyl alcohol resin (average degree of polymerization 1,700, degree of saponification 99 mol %, crystallinity 35%). They were stirred at 90° C. for about two hours for dissolution. This solution was cooled to 40° C. To the solution were added 200 g of hydrochloric acid having a concentration of 351 by weight and 160 g of n-butyraldehyde, whereby acetalization reaction was performed and a reaction product was precipitated. The amount of n-butyraldehyde added was 68 mol % relative to 100 mol % of the polyvinyl alcohol resin. The mixture was then held at 10° C. for three hours to complete the reaction. Neutralization, washing with water, and drying were performed by conventional methods, whereby white powder of a polyvinyl acetal resin was obtained.

Comparative Example 8

Pure water (3,100 g) was added to 300 g of a polyvinyl alcohol resin (average degree of polymerization 1,700, degree of saponification 99 mol %, crystallinity 35%). They were stirred at 90° C. for about two hours for dissolution. This solution was cooled to 40° C. To the solution were added 200 g of hydrochloric acid having a concentration of 35% by weight and 160 g of n-butyraldehyde, whereby acetalization reaction was performed and a reaction product was precipitated. The amount of n-butyraldehyde added was 68 mol % relative to 100 mol % of the polyvinyl alcohol resin. The mixture was then held at 40° C. for 0.5 hours to complete the reaction. Neutralization, washing with water, and drying were performed by conventional methods, whereby white powder of a polyvinyl acetal resin was obtained.

(Evaluation)

The polyvinyl acetal resins obtained in the examples and the comparative examples were evaluated as follows. Tables 1 to 3 show the results.

(1) Evaluation of Polyvinyl Acetal Resin (1-1) Acetal Group Content, Hydroxy Group Content, and Acetyl Group Content The obtained polyvinyl acetal resin was dissolved in DMSO-DF at a concentration of 10% by weight. The solution was subjected to $^{13}$C-NMR to measure the acetal group content, hydroxy group content, and acetyl group content.

(1-2) IR Absorption Spectrum

The obtained polyvinyl acetal resin was dissolved in a 1:1 weight ratio mixture solution of ethanol and toluene. The solution was then applied to a PET film. The thickness of the measurement sample was adjusted such that the peak appearing near 2,980 cm$^{-1}$ derived from the stretching vibrations of the C—H bond would have a minimum transmittance of 22%. A polyvinyl acetal resin sheet was thus obtained. An IR absorption spectrum was measured for the obtained polyvinyl acetal resin sheet at 20° C. using an infrared spectrophotometer (produced by HORIBA, FT-720). In the measurement results, a baseline was drawn for the peak appearing within the wavenumber range of 3,100 to 3,700 cm$^{-1}$, and correction was performed to adjust the transmittance of both ends of the peak to 100%. The corrected data was subjected to peak analysis to measure the minimum transmittance X, the transmittance a, and the wavenumbers A, B and C of the peak.

(1-3) Number and Percentage (8 by Volume) of Particles Having a Diameter of 0.5 to 1.0 μm The obtained polyvinyl acetal resin was dissolved to 0.2% by weight in a 1:1 weight ratio mixture solution of ethanol and toluene. The particle size distribution of the obtained solution (10 ml) was measured using a particle counter (produced by Rion Co., Ltd., KS-42C) to measure the number of particles having a diameter of 0.5 to 1.0 μm per 10 ml. The volume of the particles having a diameter of 0.5 to 1.0 μm was calculated assuming that they were true spheres having a diameter of 0.75 μm. Based on the obtained measurement results, the percentage (i by volume) of the particles having a diameter of 0.5 to 1.0 μm was calculated.

(2) Evaluation of Resin Sheet

The obtained polyvinyl acetal resin (10 parts by weight) was added to 90 parts by weight of a solvent mixture of ethanol and toluene (weight ratio 1:1), and dissolved by stirring. Thus, a composition for a resin sheet was obtained.

The obtained composition for a resin sheet was applied to a release-treated PET film to a dried thickness of 20 μm using a coater. The composition was heated and dried, whereby a measurement sample (resin sheet) was prepared.

(2-1) Modulus of Elasticity

The tensile modulus of elasticity (MPa) of the obtained measurement sample was measured in conformity with JIB R 7113 using a tensile tester (produced by Shimadzu Corporation, AUTOGRAPH AGS-J) at a tensile speed of 20 mm/min.

(2-2) Stress at the Upper Yield Point, Stress at Break, and Strain at Break

The obtained measurement sample was formed into a specimen in the shape of Type 1 dumbbell (in conformity with JIS K 6771). The specimen was stretched using a tensile tester (produced by Shimadzu Corporation, AUTOGRAPH AGS-J) at a tensile speed of 500%/min to measure the tensile strength at break (kg/cm$^2$) at a measurement temperature of 20° C. From the obtained values, a stress a (MPa)-strain ε (%) curve was determined. The 500%/min means the speed at which the specimen was moved such that the chuck distance of the specimen reaches five times its initial value in one minute. From the obtained stress-strain curve, the stress at the upper yield point, the stress at break, and the strain at break were determined.

(2-3) Breaking after Separation

The obtained measurement sample was separated from the PET film. The state of the sample was visually observed to evaluate the releasability in accordance with the following criteria.

○ (Good): The resin sheet was cleanly separated from the PET film, and no cut or peeling was observed on the separated sheet.

Δ (Fair): The resin sheet was cleanly separated from the PET film, and small cuts were observed in only a small part of the separated sheet.

× (Poor) The resin sheet was not separated from the PET film, or cuts and/or peeling were/was observed in most of the separated sheet.

(3) Evaluation of Ceramic Green Sheet (Preparation of Inorganic Dispersion)

One part by weight of a polyvinyl acetal resin (produced by Sekisui Chemical Co., Ltd., BL-1) was added to a solvent mixture of 20 parts by weight of toluene and 20 parts by weight of ethanol, and they were stirred for dissolution. Subsequently, to the obtained solution was added 100 parts by weight of barium titanate powder (produced by Sakai Chemical Industry Co., Ltd., BT01), followed by stirring in a bead mill (produced by AMEX Co., Ltd., Ready Hill) for 180 minutes, whereby an inorganic dispersion was prepared.

(Preparation of Resin Solution)

The obtained polyvinyl acetal resin (8 parts by weight) and 2 parts by weight of DOP were added to a solvent mixture of 45 parts by weight of ethanol and 45 parts by weight of toluene, and they were stirred for dissolution. Thus, a resin solution was prepared.

(Preparation of Ceramic Green Sheet)

The resin solution was added to the obtained inorganic dispersion, and they were stirred for 90 minutes in a bead mill, whereby a composition for a ceramic green sheet was obtained.

The obtained composition for a ceramic green sheet was applied to a release-treated PET film to a dried thickness of 20 μm using a coater. The composition was heated and dried, whereby a ceramic green sheet was prepared.

(3-1) Number of Defects Having a Cross Sectional Area of 1 μm$^2$ or Greater

Ten 14,000-μm$^2$ fields of view were randomly selected on a surface of the obtained ceramic green sheet. The average number of defects per field of view was counted using a 3D laser scanning microscope (produced by Keyence Corporation, "VK-X100").

The defect herein refers to a reduced valley having a cross sectional area of 1 μm$^2$ or greater at an areal material ratio of 80%.

(3-2) Arithmetic Mean Height (Sa) and Maximum Height (Sz)

The arithmetic mean height Sa of the obtained ceramic green sheet was evaluated in conformity with ISO25178 using a surface roughness tester (produced by Ryoka Systems Inc., "VertScan 2.0").

TABLE 1

| | Polyvinyl acetal resin | | | | | | | | |
|---|---|---|---|---|---|---|---|---|---|
| | Average degree of polymerization | Acetal group content (mol %) | Acetyl group content (mol %) | Hydroxy group content (mol %) | Minimum transmittance X (%) | Transmittance a (%) | Wave-number A (cm$^{-1}$) | Wave-number B (cm$^{-1}$) | Wave-number C (cm$^{-1}$) |
| Example 1 | 1,700 | 66.5 | 2.0 | 31.5 | 64.9 | 82.45 | 3315 | 3556 | 3468 |
| Example 2 | 1,900 | 47.0 | 16.0 | 37.0 | 60.1 | 80.05 | 3340 | 3560 | 3482 |
| Example 3 | 3,000 | 70.2 | 1.8 | 28.0 | 66.2 | 83.10 | 3327 | 3556 | 3468 |
| Example 4 | 800 | 62.0 | 1.6 | 36.4 | 61.0 | 80.50 | 3295 | 3555 | 3470 |
| Example 5 | 1,700 | 66.8 | 0.8 | 32.4 | 62.8 | 81.40 | 3290 | 3559 | 3468 |
| Example 6 | 1,700 | 67.1 | 0.9 | 32.0 | 63.0 | 81.50 | 3300 | 3580 | 3466 |
| Example 7 | 1,700 | 64.3 | 1.7 | 34.0 | 62.0 | 81.00 | 3310 | 3560 | 3468 |
| Example 8 | 1,900 | 53.0 | 11.0 | 36.0 | 61.3 | 80.65 | 3342 | 3560 | 3480 |
| Example 9 | 3,000 | 59.0 | 12.0 | 29.0 | 65.9 | 82.95 | 3362 | 3562 | 3482 |
| Comparative Example 1 | 1,700 | 67.5 | 0.5 | 32.0 | 63.2 | 81.60 | 3290 | 3557 | 3468 |
| Comparative Example 2 | 1,900 | 35.0 | 20.0 | 45.0 | 56.0 | 78.00 | 3280 | 3550 | 3478 |
| Comparative Example 3 | 8,100 | 64.5 | 1.0 | 34.5 | 61.6 | 80.80 | 3280 | 3558 | 3470 |
| Comparative Example 4 | 800 | 54.5 | 0.5 | 45.0 | 56.0 | 78.00 | 3255 | 3546 | 3468 |
| Comparative Example 5 | 1,700 | 67.1 | 0.9 | 32.0 | 63.2 | 81.60 | 3292 | 3557 | 3468 |
| Comparative Example 6 | 250 | 60.5 | 1.5 | 38.0 | 59.5 | 79.75 | 3283 | 3555 | 3468 |
| Comparative Example 7 | 1,700 | 62.0 | 1.0 | 37.0 | 61.8 | 80.90 | 3280 | 3556 | 3468 |
| Comparative Example 8 | 1,700 | 62.0 | 1.0 | 37.0 | 61.3 | 80.65 | 3270 | 3559 | 3468 |

TABLE 2

| | Polyvinyl acetal resin | | | | | | | | | |
|---|---|---|---|---|---|---|---|---|---|---|
| | 3470 − A (cm$^{-1}$) | C − A (cm$^{-1}$) | B − C (cm$^{-1}$) | [3470 − A]/[B − 3470] | (C − A)/(B − C) | (3740 − A)/Hydroxy group content (cm$^{-1}$/mol %) | (3470 − A)/Acetal group content (cm$^{-1}$/mol %) | (C − A)/Acetal group content (cm$^{-1}$/mol %) | (B − 3470)/Hydroxy group content (cm$^{-1}$/mol %) | (B − 3470)/Acetal group content (cm$^{-1}$/mol %) |
| Example 1 | 155 | 153 | 90 | 1.76 | 1.70 | 4.92 | 2.33 | 2.30 | 2.79 | 1.32 |
| Example 2 | 130 | 142 | 78 | 1.44 | 1.82 | 3.51 | 2.77 | 3.02 | 2.43 | 1.91 |
| Example 3 | 143 | 141 | 88 | 1.66 | 1.80 | 5.11 | 2.04 | 2.01 | 3.07 | 1.23 |
| Example 4 | 175 | 175 | 85 | 2.08 | 2.06 | 4.81 | 2.82 | 2.82 | 2.34 | 1.37 |
| Example 5 | 180 | 178 | 91 | 2.02 | 1.96 | 5.56 | 2.59 | 2.66 | 2.75 | 1.33 |
| Example 6 | 170 | 166 | 94 | 1.89 | 1.77 | 5.31 | 2.53 | 2.47 | 2.81 | 1.34 |
| Example 7 | 160 | 168 | 92 | 1.78 | 1.72 | 4.71 | 2.49 | 2.46 | 2.65 | 1.40 |
| Example 8 | 128 | 138 | 80 | 1.42 | 1.73 | 3.56 | 2.42 | 2.80 | 2.50 | 1.70 |
| Example 9 | 108 | 120 | 80 | 1.17 | 1.50 | 3.72 | 1.83 | 2.03 | 3.17 | 1.56 |
| Comparative Example 1 | 180 | 178 | 89 | 2.07 | 2.00 | 5.63 | 2.57 | 2.64 | 2.72 | 1.29 |
| Comparative Example 2 | 190 | 198 | 72 | 2.38 | 2.75 | 4.22 | 5.43 | 5.66 | 1.78 | 2.29 |
| Comparative Example 3 | 190 | 190 | 88 | 2.16 | 2.16 | 5.51 | 2.95 | 2.95 | 2.55 | 1.36 |
| Comparative Example 4 | 215 | 213 | 78 | 2.83 | 2.73 | 4.78 | 3.94 | 3.91 | 1.89 | 1.39 |
| Comparative Example 5 | 178 | 176 | 89 | 2.05 | 1.96 | 5.56 | 2.65 | 2.82 | 3.72 | 1.30 |
| Comparative Example 6 | 187 | 185 | 87 | 2.20 | 2.13 | 4.92 | 3.09 | 3.06 | 2.24 | 1.40 |
| Comparative Example 7 | 190 | 188 | 88 | 2.21 | 2.14 | 5.14 | 3.06 | 3.03 | 2.32 | 1.39 |
| Comparative Example 8 | 200 | 198 | 91 | 2.25 | 2.18 | 5.41 | 3.23 | 3.19 | 2.41 | 1.44 |

TABLE 3

| | Polyvinyl acetal resin | | Resin sheet | | | | | Ceramic green sheet | | |
|---|---|---|---|---|---|---|---|---|---|---|
| | Number of particles having particle size of 0.5 to 1.0 μm | Percentage of particles having particle size of 0.5 to 1.0 μm (10% by volume) | Modulus of elasticity (MPa) | Stress at upper yield point (MPa) | Stress at break (MPa) | Strain at break (%) | Breaking after seperation | Number of defects having cross sectional area of 1 μm$^2$ or greater | Arithmatic mean height Sa (μm) | Maximum height Sz (μm) |
| Example 1 | 1263 | 2.79 | 840 | 45 | 75 | 340 | ○ | 585 | 0.073 | 3.457 |
| Example 2 | 212 | 0.47 | 748 | 33 | 65 | 350 | ○ | 285 | 0.062 | 2.622 |

TABLE 3-continued

| | Polyvinyl acetal resin | | Resin sheet | | | | | Ceramic green sheet | | |
|---|---|---|---|---|---|---|---|---|---|---|
| | Number of particles having particle size of 0.5 to 1.0 μm | Percentage of particles having particle size of 0.5 to 1.0 μm (10% by volume) | Modulus of elasticity (MPa) | Stress at upper yield point (MPa) | Stress at break (MPa) | Strain at break (%) | Breaking after seperation | Number of defects having cross sectional area of 1 μm² or greater | Arithmatic mean height Sa (μm) | Maximum height Sz (μm) |
| Example 3 | 349 | 0.77 | 973 | 49 | 68 | 360 | ○ | 263 | 0.061 | 2.633 |
| Example 4 | 267 | 0.89 | 740 | 47 | 50 | 240 | ○ | 261 | 0.055 | 2.649 |
| Example 5 | 1915 | 4.23 | 855 | 46 | 76 | 330 | ○ | 722 | 0.075 | 3.501 |
| Example 6 | 1951 | 4.31 | 858 | 46 | 78 | 350 | ○ | 778 | 0.082 | 3.689 |
| Example 7 | 896 | 1.98 | 850 | 46 | 80 | 360 | ○ | 373 | 0.070 | 3.337 |
| Example 8 | 249 | 0.55 | 790 | 38 | 70 | 370 | ○ | 297 | 0.055 | 2.608 |
| Example 9 | 294 | 0.65 | 803 | 39 | 67 | 390 | ○ | 254 | 0.052 | 2.578 |
| Comparative Example 1 | 3325 | 7.35 | 790 | 43 | 64 | 280 | ○ | 1022 | 0.098 | 4.301 |
| Comparative Example 2 | 5236 | 11.6 | 580 | 20 | 55 | 230 | x | 2235 | 0.084 | 8.233 |
| Comparative Example 3 | 3655 | 8.07 | 900 | 53 | 49 | 202 | Δ | 1569 | 0.101 | 4.428 |
| Comparative Example 4 | 7842 | 17.3 | 760 | 40 | 48 | 236 | x | 2698 | 0.161 | 8.665 |
| Comparative Example 5 | 3273 | 7.23 | 790 | 43 | 64 | 280 | ○ | 1017 | 0.095 | 4.334 |
| Comparative Example 6 | 2245 | 4.96 | 560 | 31 | 42 | 180 | x | 955 | 0.090 | 4.100 |
| Comparative Example 7 | 3703 | 8.18 | 770 | 44 | 58 | 240 | Δ | 1135 | 0.103 | 4.450 |
| Comparative Example 8 | 4115 | 9.09 | 759 | 46 | 58 | 220 | Δ | 1243 | 0.106 | 5.300 |

INDUSTRIAL APPLICABILITY

The present invention can provide a polyvinyl acetal resin which leaves less fine undissolved matter when dissolved in an organic solvent and thus can improve productivity particularly when used as a binder for a ceramic green sheet, and which can also provide a ceramic green sheet having excellent toughness and enables production of a highly reliable multilayer ceramic capacitor.

The invention claimed is:

1. A polyvinyl acetal resin having:
   a wavenumber A in cm$^{-1}$ of a peak within a range of 3,100 to 3,700 cm$^{-1}$ in an IR absorption spectrum measured using an infrared spectrophotometer; and
   a hydroxy group content in mol %,
   wherein the wavenumber A of the peak and the hydroxy group content satisfy relations of the following formulas (1) and (2):

$$[(3{,}470-A)/\text{Hydroxy group content}] \leq 5.5 \quad (1)$$

$$(3{,}470-A) \leq 185 \quad (2)$$

wherein A is a wavenumber which is lower than 3,470 cm$^{-1}$ and at which a transmittance a in % satisfies [100−(100−X)/2],
      wherein X in % is a minimum transmittance of the peak within the wavenumber range of 3,100 to 3,700 cm$^{-1}$, and
   wherein a solution of the polyvinyl acetal resin at a concentration of 0.2% by weight in a 1:1 weight ratio mixture solution of ethanol and toluene has a percentage of particles having a diameter of 0.5 to 1.0 μm of 4.42×10$^{-8}$% by volume or lower relative to 100% by volume of the resin solution when a particle size distribution of the resin solution is determined using a particle counter.

2. The polyvinyl acetal resin according to claim 1, wherein the hydroxy group content is 18 to 40 mol %.

3. The polyvinyl acetal resin according to claim 1, wherein the polyvinyl acetal resin has a wavenumber B in cm$^{-1}$ of the peak within the wavenumber range of 3,100 to 3,700 cm$^{-1}$ in the IR absorption spectrum measured using the infrared spectrophotometer, and
   wherein the wavenumber A of the peak and the wavenumber B of the peak satisfy a relation of the following formula (3):

$$(3{,}470-A)/(B-3{,}470) \leq 3.0 \quad (3)$$

wherein B is a wavenumber which is higher than 3,470 cm$^{-1}$ and at which the transmittance a in % satisfies [100−(100−X)/2],
      wherein X in % is the minimum transmittance of the peak within the wavenumber range of 3,100 to 3,700 cm$^{-1}$.

4. The polyvinyl acetal resin according to claim 1, wherein the polyvinyl acetal resin is for a ceramic green sheet.

5. The polyvinyl acetal resin according to claim 2, wherein the polyvinyl acetal resin has a wavenumber B in cm$^{-1}$ of the peak within the wavenumber range of 3,100 to 3,700 cm$^{-1}$ in the IR absorption spectrum measured using the infrared spectrophotometer, and
   wherein the wavenumber A of the peak and the wavenumber B of the peak satisfy a relation of the following formula (3):

$$(3{,}470-A)/(B-3{,}470) \leq 3.0 \quad (3)$$

wherein B is a wavenumber which is higher than 3,470 $cm^{-1}$ and at which the transmittance a in % satisfies [100−(100−X)/2], wherein X in % is the minimum transmittance of the peak within the wavenumber range of 3,100 to 3,700 $cm^{-1}$.

6. The polyvinyl acetal resin according to claim 2, wherein the polyvinyl acetal resin is for a ceramic green sheet.

7. The polyvinyl acetal resin according to claim 3, wherein the polyvinyl acetal resin is for a ceramic green sheet.

8. The polyvinyl acetal resin according to claim 5, wherein the polyvinyl acetal resin is for a ceramic green sheet.

* * * * *